United States Patent
Katayanagi

(10) Patent No.: US 7,336,977 B2
(45) Date of Patent: Feb. 26, 2008

(54) COMMUNICATION APPARATUS

(75) Inventor: Masanori Katayanagi, Yamanashi-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/736,298

(22) Filed: Apr. 17, 2007

(65) Prior Publication Data

US 2007/0184872 A1    Aug. 9, 2007

Related U.S. Application Data

(63) Continuation of application No. 10/085,064, filed on Mar. 1, 2002, now Pat. No. 7,225,000.

(30) Foreign Application Priority Data

Mar. 2, 2001    (JP)    .............................. 2001-057999

(51) Int. Cl.
*H04B 1/38* (2006.01)
*H04B 1/00* (2006.01)

(52) U.S. Cl. .................. 455/567; 455/566; 455/575.3; 340/815.45; 340/815.69

(58) Field of Classification Search ................ 455/405, 455/407, 563, 564, 567, 575.3; 340/815.45, 340/815.69; 379/428, 1, 33
See application file for complete search history.

(56) References Cited

U.S. PATENT DOCUMENTS

| 5,404,391 | A | 4/1995 | Wavroch et al. |
| 5,638,421 | A | 6/1997 | Serrano et al. |
| 6,094,565 | A | 7/2000 | Alberth et al. |
| 6,160,489 | A | 12/2000 | Perry et al. |
| 6,438,390 | B1 | 8/2002 | Awan |
| 6,954,657 | B2 | 10/2005 | Bork et al. |
| 2001/0000505 | A1 | 4/2001 | Segal et al. |
| 2002/0010008 | A1 | 1/2002 | Bork et al. |

FOREIGN PATENT DOCUMENTS

JP    2001345891    12/2001

*Primary Examiner*—Tony T. Nguyen
(74) *Attorney, Agent, or Firm*—Banner & Witcoff, Ltd.

(57) ABSTRACT

The mobile communication apparatus informs occurrence of a missed event with a vibrator 54 in response to the detection of a second state that a case separates from the other case in the apparatus. For example, the missed event can be that the apparatus has a missing incoming call, that the apparatus has an unread message, or that a missed alarm time in the apparatus has already past. Further, the apparatus informs the occurrences without recognizing the LCD 42.

21 Claims, 9 Drawing Sheets

| event | vibrating pattern |
|---|---|
| missed call | continuous vibration |
| unread message | intermittent vibration at fixed time intervals |
| set alarm time has already past | intermittent vibration at random time intervals |

*Fig.5*

| event | sound pattern |
|---|---|
| missed call | short beep |
| unread message | voice guidance. |
| set alarm time has already past | intermittent sound at random time intervals |

*Fig. 7*

COMMUNICATION APPARATUS

RELATED APPLICATION INFORMATION

This application is a continuation of U.S. patent application Ser. No. 10/085,064, filed Mar. 1, 2002 now U.S. Pat. No. 7,225,000, entitled "Communication Apparatus," hereby incorporated by reference as to its entirety. This application also claims priority under 35 U.S.C. § 119 to Japanese patent application P2001-057999, filed on Mar. 2, 2001.

FIELD OF THE INVENTION

The present invention relates to a foldable, slideable, or other similar communication apparatus that more conveniently notifies a user of a missed event.

DESCRIPTION OF THE RELATED ART

Conventional communication apparatuses, such as cellular phones, notify users of an incoming call or receipt of a text message, or an alarm set in advance, by emitting a sound or causing the apparatus to vibrate at the time of its occurrence.

When the user of the cellular phone does not answer the incoming call or otherwise respond to the notification, the cellular phone memorizes the missed call or unopened message. Thereafter, the cellular phone notifies each of their occurrences with an icon displayed on a Liquid-Crystal Display (LCD) or lighting a Light Emitting Diode (LED) display.

Therefore, the user who does not recognize the notification at the time of the occurrence may later recognize the occurrence only by visual recognition of a displayed icon on the LCD or LED after the occurrence.

Where the cellular phone is of a foldable type, the user has to open a foldable case of the phone completely to confirm whether a call, text message, or alarm has been missed according to the display. Thus, multiple operations are necessary by the user in order to determine whether a call, text message, or alarm has been missed. The user must first open the foldable case and then read the display. Another inconvenience is that in order to read the display, the user must fully open the foldable case.

There is also known a foldable cellular phone that can inform a user the above occurrences without requiring the user to open the foldable case. Such a cellular phone has an auxiliary LCD or LED on the outside of the foldable case in addition to an LCD or LED inside the case on the same side as keys.

This cellular phone, however, requires the auxiliary LCD or LED, which enlarges the case of the cellular phone and increases the number of parts of the cellular phone. It is well known that increasing the number of parts increases the cost to manufacture the phone as well as the likelihood of a malfunction.

A foldable cellular phone is also known that can notify the user of the above occurrences with the case being kept foldable by using a vibrator. The vibrator is responsive to the activation of keys disposed on the outside of the case. This cellular phone, however, also requires additional keys, thereby increasing the number of parts of the cellular phone and enlarging the case of the cellular phone.

SUMMARY OF THE INVENTION

One or more aspects of the present invention are directed to a foldable, slideable, and/or otherwise partially or fully separable communication apparatus having a first portion and a second portion. The first and second portions may be foldably, slideably, and/or otherwise moveably coupled with one another.

When the first and second portions are fully or partially separated from one another, a first detector may detect the separation. If a second detector has previously detected an event, such as a missed event occurring in the apparatus (e.g., a missed incoming call, a missed text message or a missed alarm), a controller may notify the user of the detected event responsive to the first detector detecting the separation.

The controller may cause such a notification by activating a vibrator, speaker, piezoelectric element, and/or other similar device that can produce an output noticeable by the user. Preferably, the notification would be audible or tactile, but it could be in any form such as a visible notification.

One or more further aspects of the present invention allow for a communication apparatus to not have additional lights, speakers, or other user notification outputs other than those in conventional communication apparatuses, while still providing convenient notification to the user of certain events such as missed events. In addition, a communication apparatus in accordance with these aspects may utilize the existing switch that detects whether the apparatus is opened or not.

These and other features of the invention will be apparent upon consideration of the following detailed description of exemplary embodiments. It will be apparent to those skilled in the relevant technology, in light of the present specification, that alternate combinations of aspects of the invention, either alone or in combination with one or more elements or steps defined herein, may be used as modifications or alterations of the invention or as part of the invention. It is intended that the written description of the invention contained herein cover all such modifications and alterations.

BRIEF DESCRIPTION OF THE DRAWINGS

The foregoing summary of the invention, as well as the following detailed description of exemplary embodiments, is better understood when read in conjunction with the accompanying drawings, which are included by way of example, and not by way of limitation with regard to the claimed invention.

FIG. 5 is an exemplary control table showing examples of vibrating patterns that may be used in accordance with at least one aspect of the invention.

FIG. 7 is an exemplary control table showing examples of sound patterns that may be used in accordance with at least one aspect of the invention.

DETAILED DESCRIPTION OF THE EMBODIMENTS

Various illustrative embodiments will be described with reference to the drawings.

Figure 1:
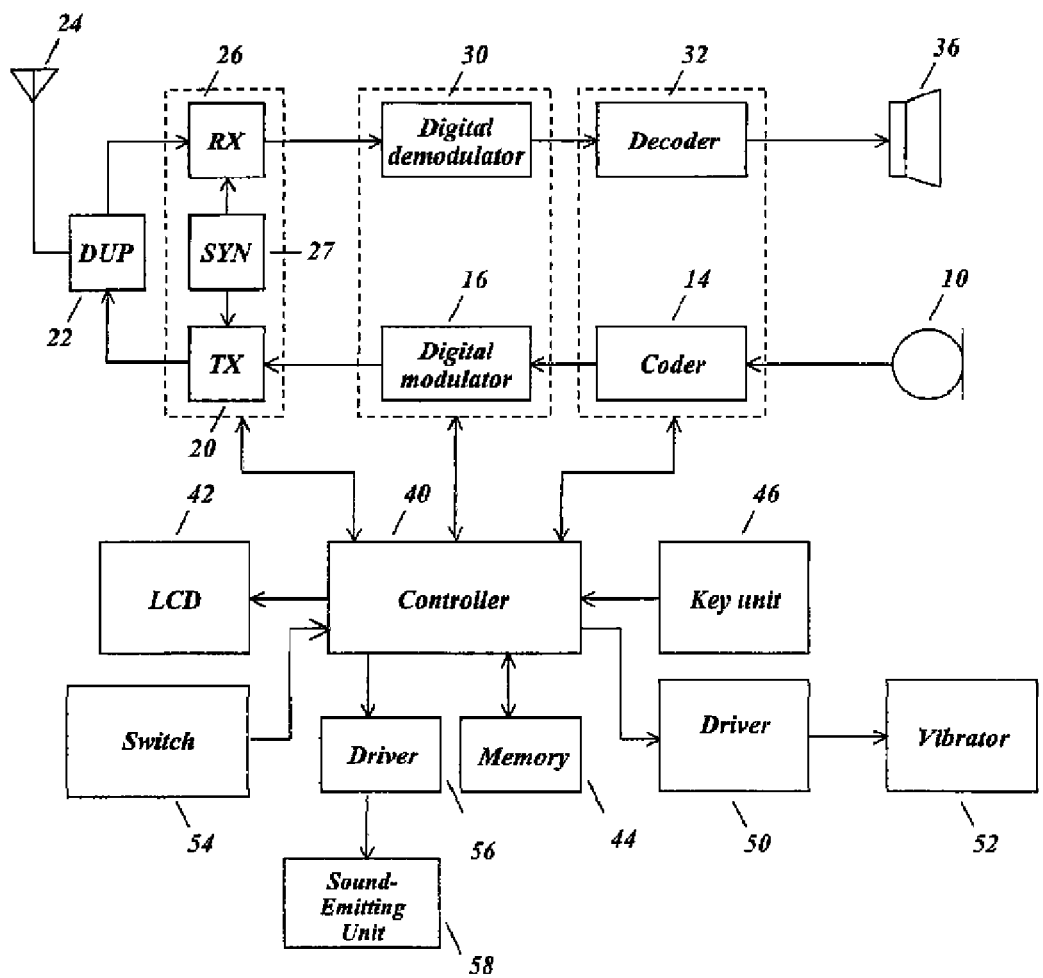
FIG. 1 is a functional block diagram of an exemplary foldable mobile communication apparatus according to at least one aspect of the invention.

FIG. 1 is a functional block diagram of an exemplary foldable communication apparatus according to at least one aspect of the invention.

The apparatus may include a microphone 10 for receiving sound, such as a user's voice, and for converting the sound to a voice signal. The voice signal may be transmitted from the microphone 10 and digitized in a coder 14 before being compressed. A digital modulator 16 may modulate the compressed signal.

A radio-transmitting unit (TX) 20 may convert the modulated and compressed signal to a high frequency signal by a local signal outputted from a synthesizer (SYN) 27. The converted high frequency signal may be thereafter amplified in power up to a specified power level.

The amplified signal may be supplied to an antenna 24 by a duplexer (DUP) 22. The signal may then be transmitted as a radio high frequency signal via the antenna 24.

To receive, at antenna 24, a radio signal with a high frequency transmitted from a base station while another radio signal is being sent out by the apparatus 1, the apparatus 1 may include a duplexer 22.

The duplexer 22 may allow the transmitted signal from the radio-transmitting unit 20 or reach the antenna 24 while allowing the received radio signal to reach a radio-receiving unit (RX) 26. The radio-receiving unit 26 may amplify the received high frequency signal and convert the amplified signal to a base band signal in accordance with a local signal generated by a synthesizer (SYN) 27.

The converted base band signal may then be inputted to a digital demodulator 30 for demodulation. The demodulated signal may then be inputted to a decoder 32.

The decoder 32 may decode the demodulated signal and convert the decoded signal to an analog voice signal. The analog voice signal may then be outputted from a speaker 36, earphone, or other similar output device.

A controller 40 may be coupled to a Liquid Crystal Display (LCD) 42 or other display device, a memory 44, and/or a key unit 46 to allow the user to input information using one or more buttons, keys, touch-sensitive surfaces, or other similar input devices. The controller 40 may be a single unit or may be composed of multiple physically and/or logically separate elements such as one or more processor, microprocessor, control circuits, detectors, and/or input interfaces. The controller 40 may be further coupled to a driver 50 for driving a vibrator 52. The vibrator 52 may cause some or all of the apparatus 1 to vibrate. The controller may be further coupled to a driver 56 for driving a sound-emitting unit 58. The sound-emitting unit 58 may be a speaker, piezoelectric element, or any other device that generates or otherwise emits sound.

Figure 2A:
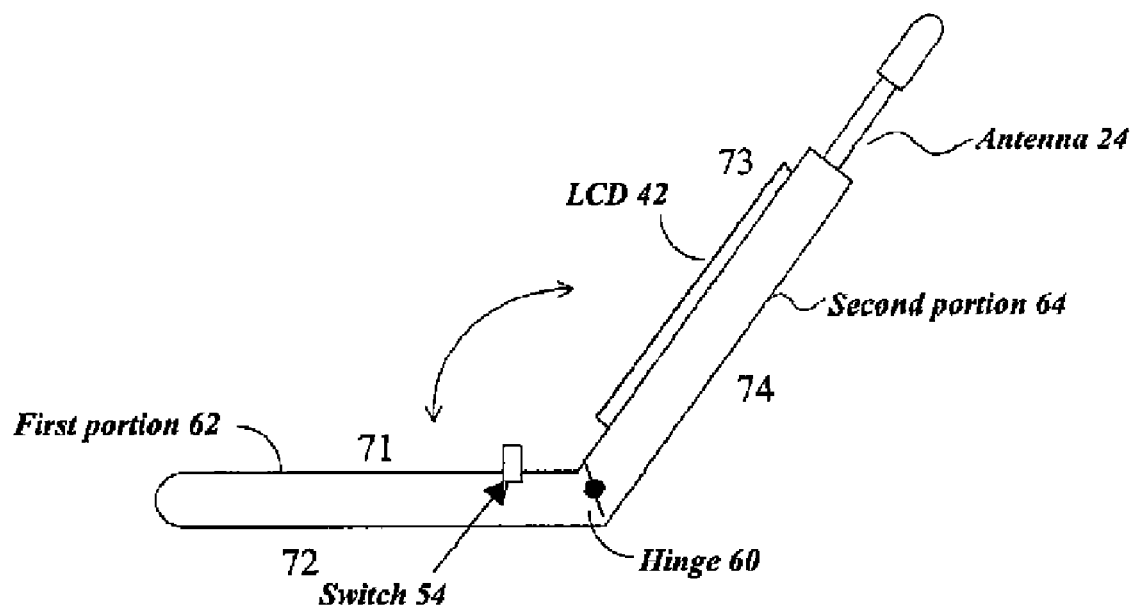
FIG. 2A is a side view of the foldable mobile communication apparatus of FIG. 1 shown in an open position.
Figure 2B:
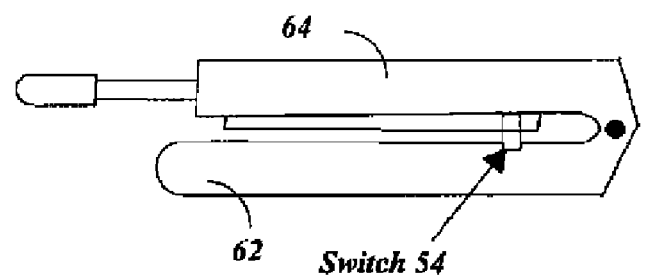
FIG. 2B is a side view of the foldable mobile communication apparatus of FIG. 1 shown in a closed position.

As shown in FIGS. 2A and 2B, the foldable mobile communication apparatus 1 may include a first portion 62 and a second portion 64. In the exemplary embodiment shown, the first and second portions 62, 64 are coupled at a hinge 60, thereby allowing the apparatus 1 to be foldable at the hinge 60. In FIG. 2A, the apparatus 1 is shown in an "open" position such that the first and second portions 62, 64 are partially separated from one another and contact each other only at their common hinged ends. FIG. 2B shows the apparatus 1 in a "closed" position such that the first and second portions 62, 64 are folded toward each other wherein their respective inner sides 71, 73 are substantially parallel with each other.

The apparatus 1 may include a first detector, which may include a switch 54 and/or switch driving/detecting circuitry, to detect whether the apparatus 1 is in a closed or open position. The switch 54 may be disposed in or on either the first or second portions 62, 64 or disposed in or on the hinge 60. To indicate whether the apparatus 1 is in a closed or open position, the switch 54 may, for example, output a particular signal, voltage, or current, and/or open or close an electrical circuit depending upon the state of the switch 54.

Figure 3:
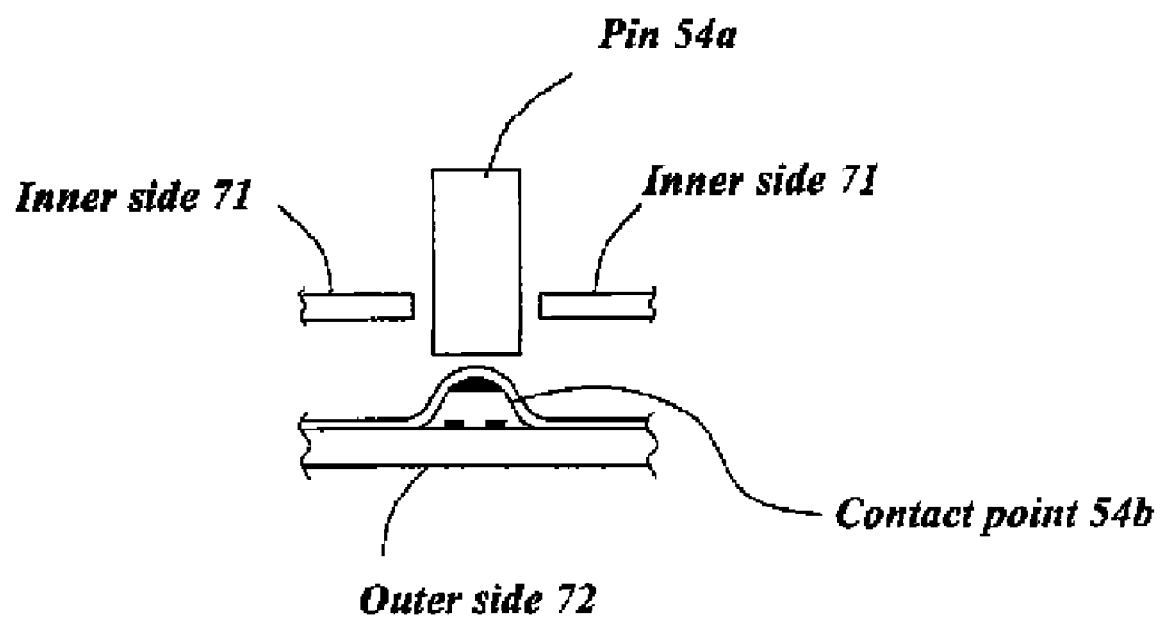
FIG. 3 is a plan view showing of an exemplary switch that may be included in the apparatus of FIGS. 1 and 2.

Referring to FIG. 3, the switch 54 may include a pin 54a and/or a contact point 54b.

The pin 54a may be movable into and out of the inner side 71 of the first portion 62. The contact point 54b may face the pin 54a. The pin 54a may be located, for example, between the inner and outer sides 71, 72 of the first portion 62.

The contact point 54b may include both a moving contact point and a stationary contact point; switches of this type are well known.

When the switch 54 is engaged, the moving and stationary contact points may cause electrical continuity to be completed or broken, depending upon the configuration of the switch 54.

The ON and OFF states of the switch may correspond to the open and closed positions, respectfully, or to the closed and open positions, respectfully, of the apparatus 1. The controller 40 may detect the state of the switch 54 to determine the corresponding position of the apparatus 1.

As the first and second portions 62, 64 close together, the inner surface 73 of the second portion 64 presses the pin 54a toward the contact point 54b such that the contact point 54b contacts with the pin 54a.

The switch 54 is thereby placed in the ON state, and the detector informs the controller 40 of the state of the ON state of the switch 54 and that therefore (in this example) the apparatus 1 is in a closed position or is being placed in a closed position.

As the first and second portions 62, 64 open away from one another, the inner surface 73 of the second portion 64 does not press the pin 54a against the contact point 54b, and thus the pin 54a is electrically isolated from the pin 54a.

The switch 54 is thereby placed in the OFF state, and the detector informs of the controller 40 the OFF state of the switch 54 and that therefore (in this example) the apparatus 1 is in an open position or is being placed in an open position. In response, the controller 40 may cause an output to be detectable by the user, such as by lighting the LCD 42 or key 46.

Since the type of switch used will affect whether the switch 54 is in an ON or OFF state in any particular position of the apparatus 1, the two states of the switch 54 are referred to generically herein as first and second states of the switch 54. When the apparatus 1 is in a closed position, the switch 54 is referred to herein as being in the first state. When the apparatus 1 is in an open position, the switch 54 is referred to herein as being in the second state.

In the second state, a user can check information displayed on the LCD 42 in the second case 64. In the first state, a user cannot check information display on the LCD 42 as the LCD 42 contacts with the first case.

In this embodiment, when the switch 54 detects OFF in the second state, the foldable mobile communication apparatus informs of a user an event with the vibrator 52. The event had occurred in the foldable mobile communication apparatus before the detection.

In alternative embodiments, the switch 54 may be any other type of switch such as a magnetic-type switch that detects the mating of the two portions 62, 64. In addition, the switch 54 may be disposed in only one of the portions 62, 64 or the hinge 60, or distributed among any two or more of the portions 62, 64 and/or the hinge 60.

In the second state of the switch 54 (where the apparatus 1 is in the open position), a user can view information displayed on the LCD 42. However, in the first state of the switch 54 (where the apparatus 1 is in the closed position), the user cannot view any information displayed on the LCD 42 of the apparatus 1 since the LCD 42 is covered by the first portion 62.

Responsive to the switch 54 being placed in the second state (i.e., responsive to the apparatus 1 being opened), the apparatus 1 may inform the user of an event by activating the vibrator 52.

The event may be a missed incoming call, a missed text message, a missed alarm, and/or another event that had occurred in the apparatus 1 prior to the apparatus 1 being placed in the open position (and the switch 54 being placed in the second state).

Figure 4:
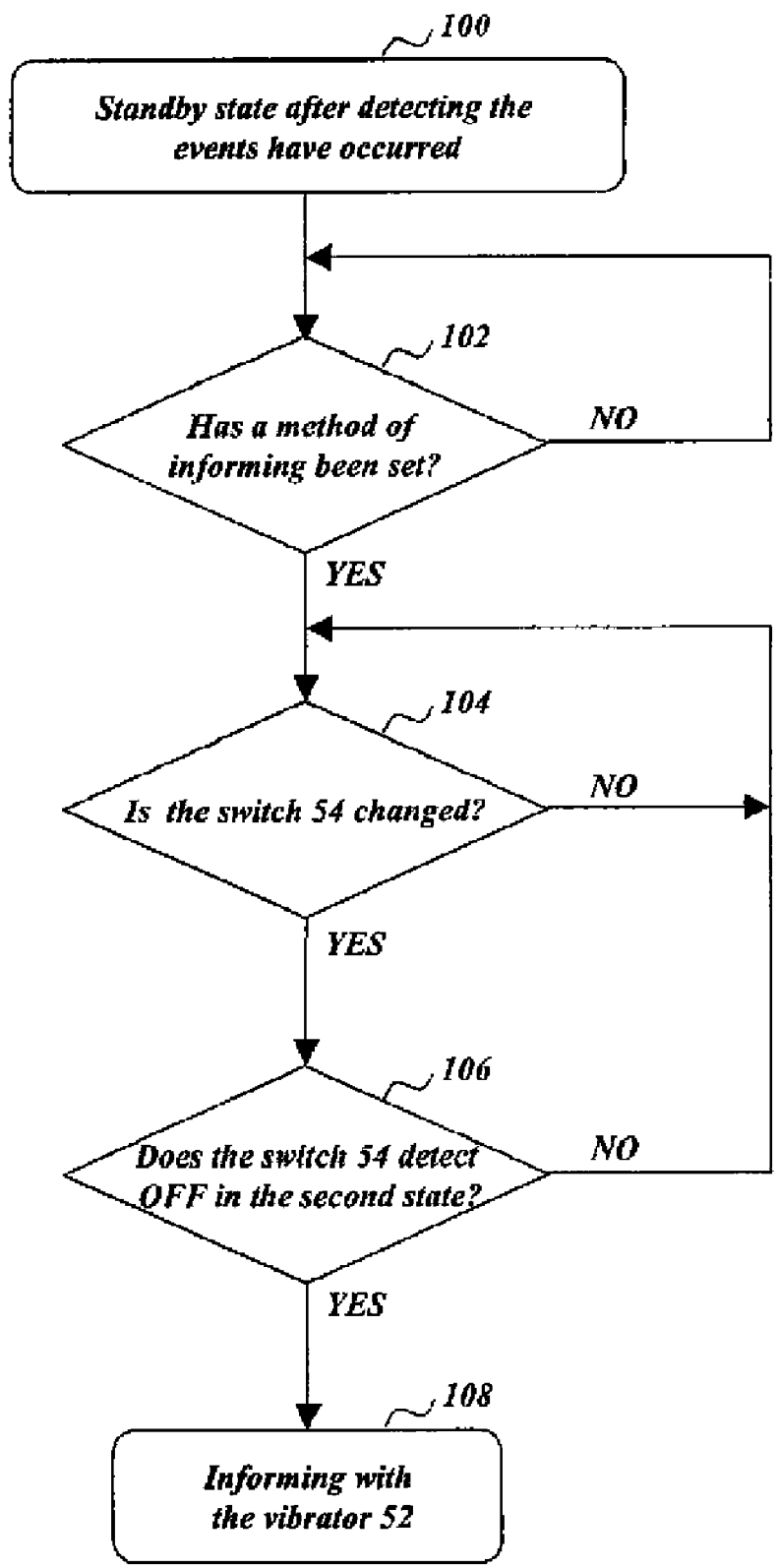
FIG. 4 is a flow chart showing an exemplary control method according to at least one aspect of the invention.

Next, an exemplary control function in this embodiment will be explained with reference to FIG. 4.

When the foldable mobile communication apparatus 1 is in a standby state after detecting a missed event, the controller 40 recognizes the state (step 100).

The control unit 40 checks whether a method of notifying the user of the missed event has already been set in the apparatus (step 102).

For example, the user may configure the apparatus 1 such that notification of missed events occurs by activating the vibrator 52, the sound-emitting unit 58, or both. Alternatively, the user could select that no notification is performed. Also, the apparatus 1 may be configured to set a default notification method should none be chosen by the user.

If the notification method has already been set (step 102), the controller 40 checks whether the state of the switch 54 is changed or not (step 104).

If the state of the switch 54 is changed (step 104), the controller 40 checks whether the state of the switch 54 is changed from the first state to the second state (step 106).

If so, the controller 40 notifies the user of the missed event using the chosen notification method (e.g., with the vibrator 52 and/or sound emitting unit 58) (step 108).

As described above, the foldable mobile communication apparatus 1 may notify the user of the occurrence of any one or more of the above-discussed events with the vibrator 52 and/or sound-emitting unit 58 in response to the detection of the second state of the switch 54 and/or in response to the apparatus 1 being opened. Further, the apparatus may notify the user of such an occurrence without requiring the user to read the LCD 42.

In some embodiments, the switch 54 may be configured such that the apparatus 1 need not be fully opened in order for the missed event notification to be performed. In other words, steps 104 and 106 may produce an affirmative decision that the switch 54 has changed to the second state where the user has only partially opened the apparatus 1.

This may, for example, allow the user to check the status of any missed events without having to remove the apparatus 1 from his or her pocket, since, for example, the user might be able to partially open the apparatus 1 while the apparatus 1 is still in the user's pocket.

The apparatus 1 may provide different notifications depending upon the user's preference, the type of event associated with the notification, and/or other factors. This may allow the user to easily distinguish between the different types of missed events. For example, where the notifications are vibrations from the vibrator 52, the patterns of vibration may be different. To implement such a feature, the foldable mobile communication apparatus 1 may store a control table, such as that shown in FIG. 5, in the memory 44. The control table of FIG. 5 associates a vibrating pattern of the vibrator 52 with each of various types of events.

The apparatus 1 may control the vibration depending upon the information stored in the control table.

For example, where the apparatus 1 detects that a missed call has occurred (i.e., an incoming call event has been missed, the controller 40 controls the vibrator 52 to generate a continuous vibration.

On the other hand, where the apparatus 1 detects that an unread message exists (i.e., a message event has been missed), the controller 40 controls the vibrator 52 to generate an intermittent vibration at a fixed time interval.

Also, where the apparatus 1 detects that a set alarm time in the apparatus 1 has already passed (i.e., an alarm event has been missed), the controller 40 controls the vibrator 52 to generate an intermittent vibration at random time intervals.

Figure 6:
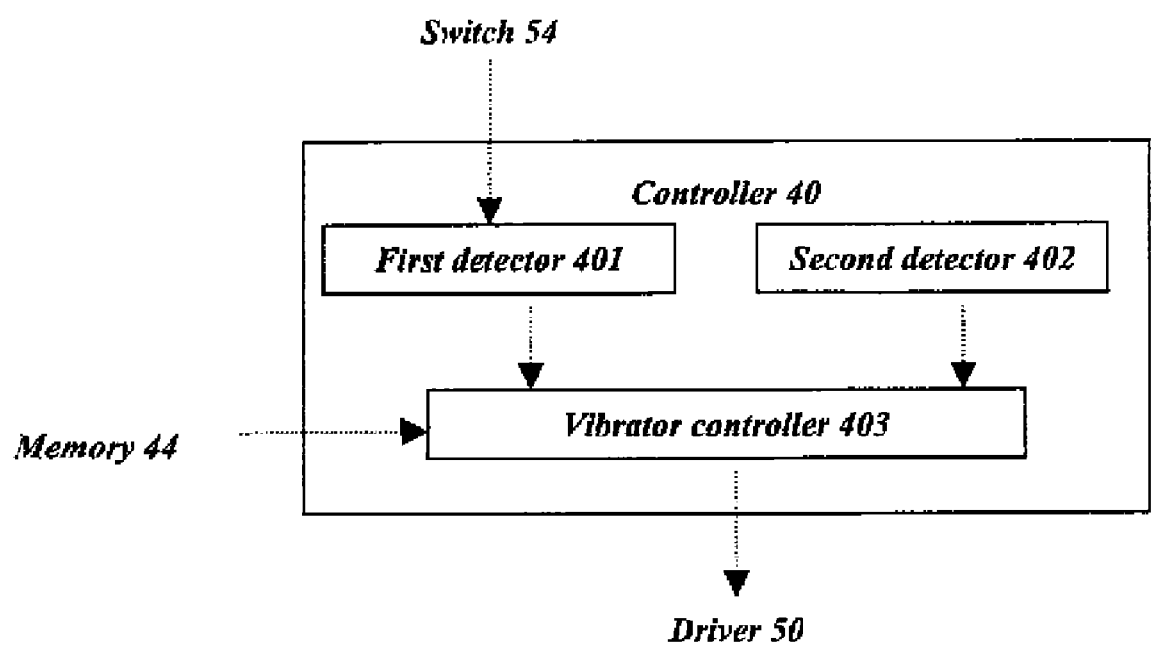
FIG. 6 is a functional block diagram of an exemplary controller according to at least one aspect of the invention.

As shown in FIG. 6, the controller 40 has a first detector 401, a second detector 402 and a vibrator controller 403. Alternatively, the first and/or second detectors 401, 402 may be separate from, and coupled to, the controller 40. The first detector 401 may detect the state of the switch 54 and produce an output depending upon the detected state of the switch 54. The switch 54 may be part of the first detector 401 or separate from it. The second detector 402 may detect occurrences of any events in the apparatus 1 and produce another output depending upon the detected occurrence. The vibrator controller 403 may control the driver 50 based upon the outputs of the detectors 401, 402 and information in the control table stored in the memory 44.

Optionally, the apparatus 1 may notify the user not only by vibrating the vibrator 52 but also by displaying information on the LCD 42. The LCD 42 may be used to display further detailed information about the notification. Therefore, after a user of the apparatus 1 feels the vibration, the user can check the meaning of the vibration on the LCD 42. This function is convenient for an unskilled user.

The method of notification, however, is not limited to vibration. For example, the foldable mobile communication apparatus 1 may notify the user with a sound generated by the sound-emitting unit 58. The sound may be any sound or combination of sounds such as a short beep or voice guidance.

The foldable mobile communication apparatus 1 may store a control table, such as that shown in FIG. 7, in the memory 44.

The control table may be user to set a sound pattern that the sound-emitting unit 58 generates to distinguish the event with the sound pattern.

The apparatus 1 may control the sound-emitting unit 58 to generate a different sound based upon the information stored in the control table. For example, the different sounds generated may differ from each other in pitch, length of time, pattern, and/or other features. The control table of FIG. 7 associates a sound pattern of the sound-emitting unit 58 with each of various types of events.

For example, where the apparatus 1 detects that a missed incoming call has occurred, the controller 40 controls the sound-emitting unit 58 to generate a short beep. Or, where the apparatus 1 detects a missed unread message, the controller 40 controls the sounder 58 to generate voice guidance. The voice guidance may, for example, use spoken language to state that a missed unread message exists.

Or, where the apparatus 1 detects that a set alarm time in the apparatus 1 has already passed, the controller 40 controls the sounder 58 to generate an intermittent sound at random time intervals.

Figure 8:
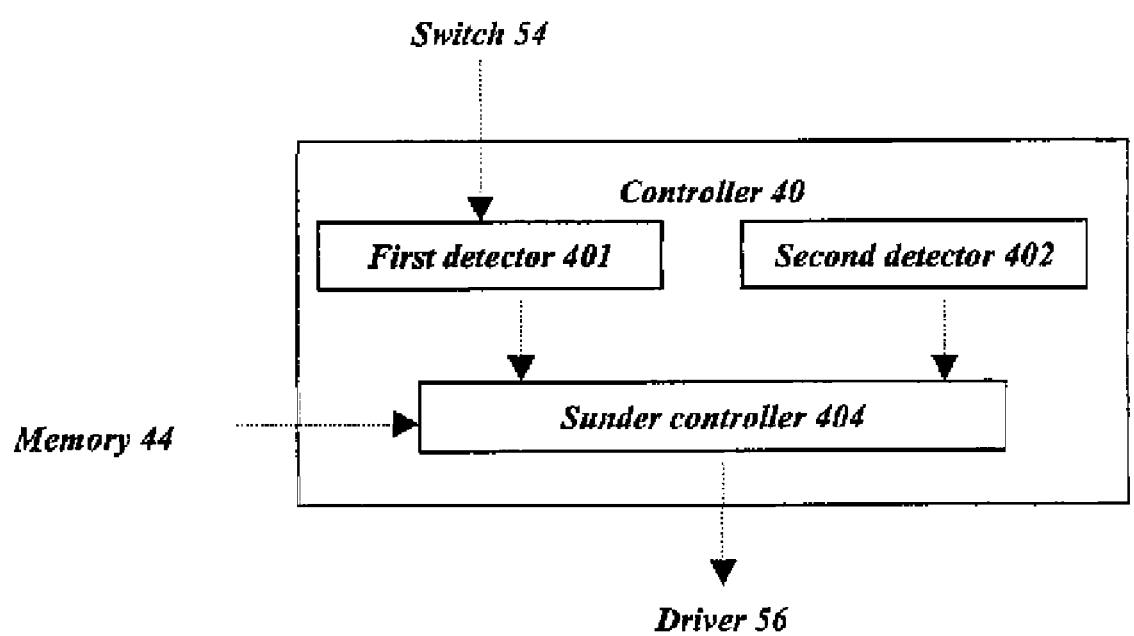
FIG. 8 is a functional block diagram of another exemplary controller according to at least one aspect of the invention.

In this case, as shown in FIG. 8, the controller 40 may have the first detector 401, the second detector 402 and/or a sound controller 404. As discussed above, the first detector 401 may detect the state of the switch 54. The second detector 402 may detect occurrences of any events in the apparatus 1. The sound controller 404 may control the driver 56 based upon the outputs of the detectors 401, 402 and information in a control table stored in the memory 44. In one exemplary embodiment, FIGS. 6 and 8 may be combined such that the apparatus 1 has both the vibrator controller 403 and the sound controller 404 each coupled to the first and second detectors 401, 402. In such an embodiment, the controller 40 may be configured to select which of the vibrator controller 403 or the sound controller 404 (or both) is to be used to notify the user of a missed event.

As explained above, according to this invention, certain embodiments of an improved communication apparatus in accordance with certain aspects of the present invention may provide advantageous notification features with no newly provided parts and no increase in the number of parts over conventional communication apparatuses. Furthermore, in some embodiments, a user of the apparatus 1 may be notified of occurrences of various events responsive to the apparatus being partially or fully opened.

Figure 9A:
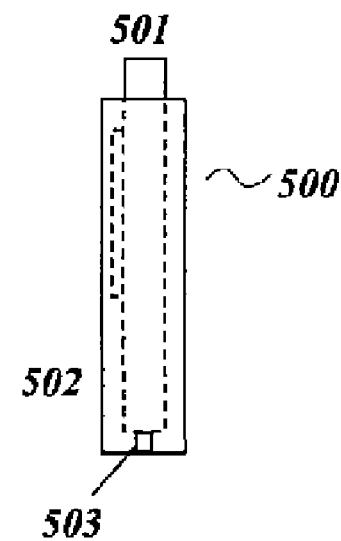
FIG. 9A is a side view of the slidable mobile communication apparatus of shown in a closed position, in accordance with at least one aspect of the present invention.
Figure 9B:
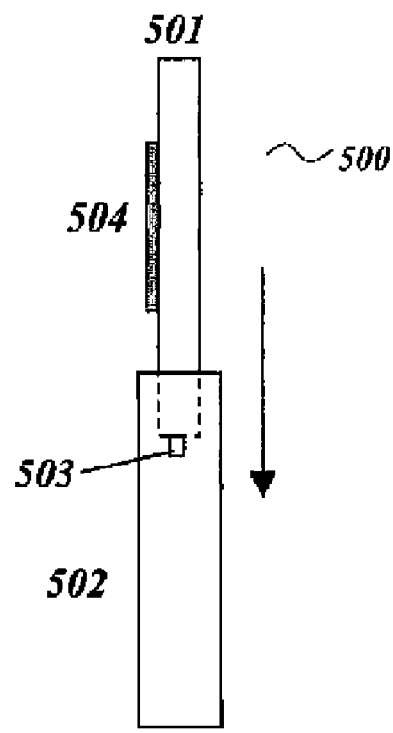
FIG. 9B is a side view of the slidable mobile communication apparatus of FIG. 9A shown in an open position.

Embodiments discussed herein are merely exemplary and are not intended to limit the scope of the invention. For example, as shown in FIGS. 9A and 9B, a mobile communication apparatus 500 may be a slideable instead of a foldable device, such that first and second portions 501, 502 are configured to slide relative to each other. FIG. 9A shows the apparatus 500 in a "closed" position such that the second portions 502 is disposed substantially or fully inside (or in alternative embodiments, alongside) the first portion 501. In FIG. 9B, the apparatus 500 is shown in an "open" position such that the first and second portions 501, 502 are partially or fully separated from one another along the axis.

The apparatus 1 may be opened by sliding the first and second portions 501, 502 away from each other and closed by sliding the first and second portions 501, 502 toward each other.

In FIGS. 9A and 9B, a switch 503 may have the same function as the switch 54 in FIG. 2A. An LCD 504 may have the same function as the LCD 42 in FIG. 2A.

In some embodiments, the first and second portions 501, 502 may be completely separable from each other in order to open the apparatus 500. Also, although a switch 54, 503 is discussed herein, any device that senses or detects the opening and/or closing of the apparatus 1, 500 may be used, and such device is not limited to a switch.

What is claimed is:

1. A communication apparatus having a first portion, a second portion and a vibrator, and configured to change between a first position and a second position different from the first position, wherein in the second position the first portion is at least partially separated from the second portion, the communication apparatus comprising:
    a first detector configured to detect that a position of the communication apparatus is the second position;
    a second detector configured to detect a missed event in the apparatus; and
    a controller coupled to the first and second detectors and configured to determine whether the position of the communication apparatus is the second position after the missed event, and if so, to activate the vibrator responsive to a detection of the second position.

2. The communication apparatus according to claim 1, wherein the detected missed event is a missed call.

3. The communication apparatus according to claim 1, wherein the detected missed event is an unread message.

4. The communication apparatus according to claim 1, wherein the detected missed event is a missed alarm time.

5. The communication apparatus of claim 1, wherein the first and second portions are configured to slide relative to each other to change the communication apparatus between the first and second positions.

6. The communication apparatus of claim 1, wherein the first and second portions are configured to slide relative to and alongside each other to change the communication apparatus between the first and second positions.

7. The communication apparatus of claim 1, wherein the first detector includes a magnetic switch, the magnetic switch being configured to change between a first state and a second state depending upon which of the first position and the second position the communication apparatus is in.

8. The communication apparatus of claim 1, wherein the first detector includes a switch having parts in both the first portion and the second portion, the switch being configured to change between a first state and a second state depending upon which of the first position and the second position the communication apparatus is in.

9. A communication apparatus having a first portion, a second portion and a sound-emitting unit, and configured to change between a first position and a second position different from the first position, wherein in the second position the first portion is at least partially separated from the second portion, the communication apparatus comprising:
    a first detector configured to detect that a position of the communication apparatus is the second position;
    a second detector configured to detect a missed event in the apparatus; and
    a controller coupled to the first and second detectors and configured to determine whether the position of the communication apparatus is the second position after the missed event, and if so, to activate the sound-emitting unit responsive to a detection of the second position.

10. The communication apparatus according to claim 9, wherein the detected missed event is a missed call.

11. The communication apparatus according to claim 9, wherein the detected missed event is an unread message.

12. The communication apparatus according to claim 9, wherein the detected missed event is a missed alarm time.

13. The communication apparatus of claim 9, wherein the first and second portions are configured to slide relative to each other to change the communication apparatus between the first and second positions.

14. The communication apparatus of claim 9, wherein the first and second portions are configured to slide relative to and alongside each other to change the communication apparatus between the first and second positions.

15. The communication apparatus of claim 9, wherein the first detector includes a magnetic switch, the magnetic switch being configured to change between a first state and a second state depending upon which of the first position and the second position the communication apparatus is in.

16. The communication apparatus of claim 9, wherein the first detector includes a switch having parts in both the first portion and the second portion, the switch being configured to change between a first state and a second state depending upon which of the first position and the second position the communication apparatus is in.

17. A communication apparatus having a first portion, a second portion and a vibrator, the communication apparatus comprising:
   a first detector configured to detect an operation to at least partially separate the first portion from the second portion;
   a second detector configured to detect a missed call and an unread message in the apparatus; and
   a controller coupled to the first and second detectors, and configured to determine whether the operation to at least partially separate the first portion from the second portion occurs after the missed call, and if so, to activate the vibrator in a first vibrating pattern responsive to the operation to at least partially separate the first portion from the second portion, wherein the controller is further configured to determine whether the operation to at least partially separate the first portion from the second portion occurs after detecting the unread message, and if so, to activate the vibrator in a second vibrating pattern which is different from the first vibrating pattern responsive to the operation to at least partially separate the first portion from the second portion.

18. The communication apparatus of claim 17, wherein the first and second portions are configured such that the operation to at least partially separate the first portion from the second portion includes sliding the first and second portions relative to each other.

19. The communication apparatus of claim 17, wherein the first and second portions are configured such that the operation to at least partially separate the first portion from the second portion includes sliding the first and second portions relative to and alongside each other.

20. The communication apparatus of claim 17, wherein the first detector includes a magnetic switch, the magnetic switch being configured to change between a first state and a second state depending upon whether first and second portions are at least partially separated from each other.

21. The communication apparatus of claim 17, wherein the first detector includes a switch having parts in both the first portion and the second portion, the switch being configured to change between a first state and a second state depending upon whether the first and second portions are at least partially separated from each other.

* * * * *